May 23, 1950  N. F. ALVARE  2,508,740
SELF-LOADING AND UNLOADING TRUCK
Filed May 19, 1948  4 Sheets-Sheet 2
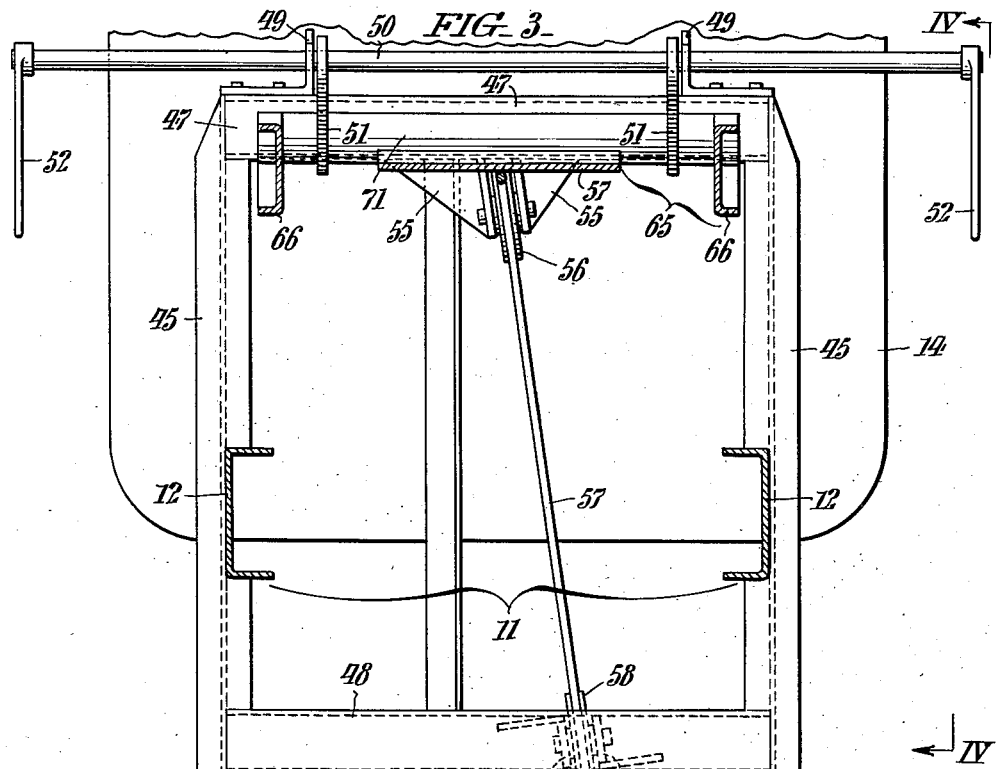
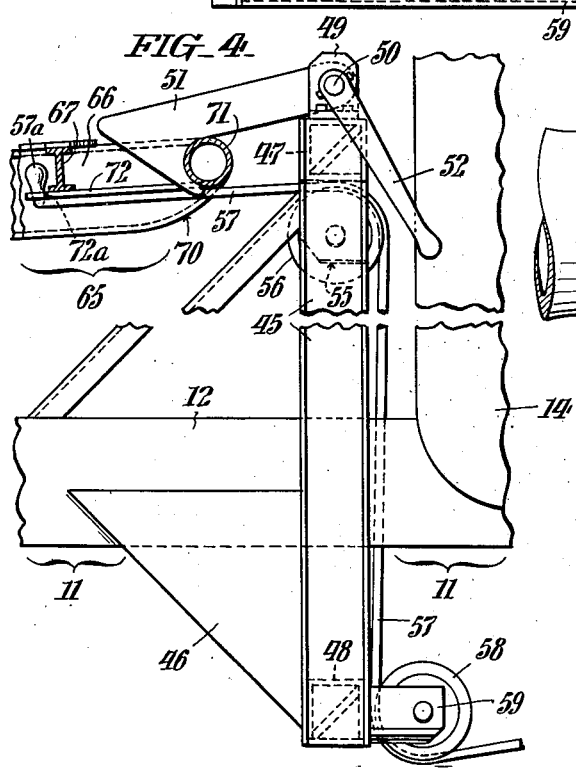
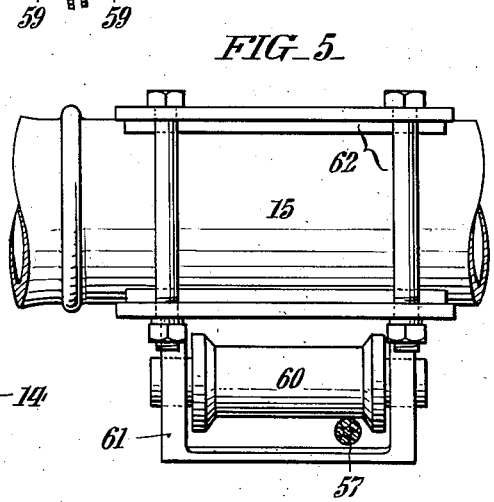
INVENTOR:
*Nemesio F. Alvare,*
BY *Paul & Paul*
ATTORNEYS.

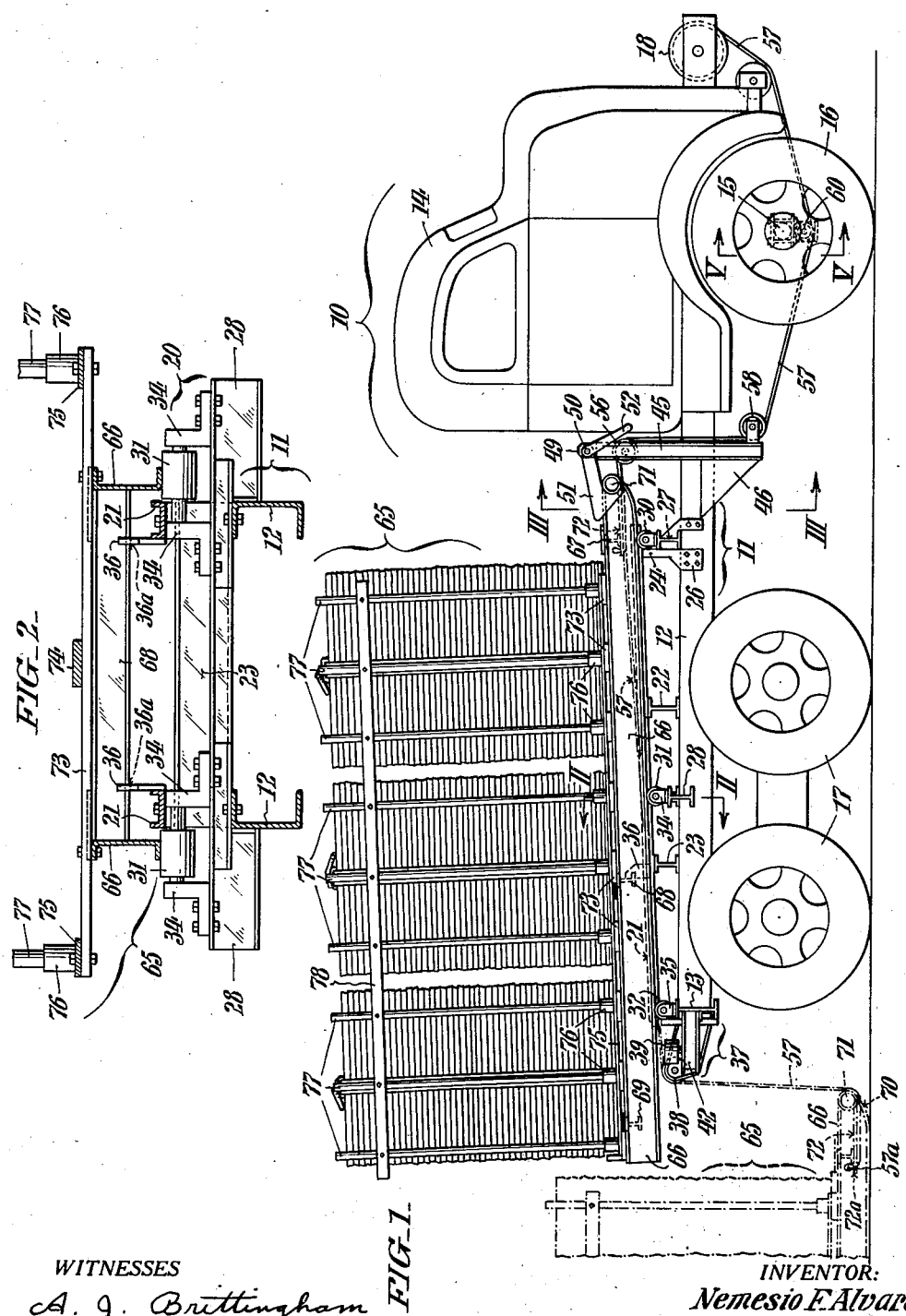

May 23, 1950 N. F. ALVARE 2,508,740
SELF-LOADING AND UNLOADING TRUCK
Filed May 19, 1948 4 Sheets-Sheet 3
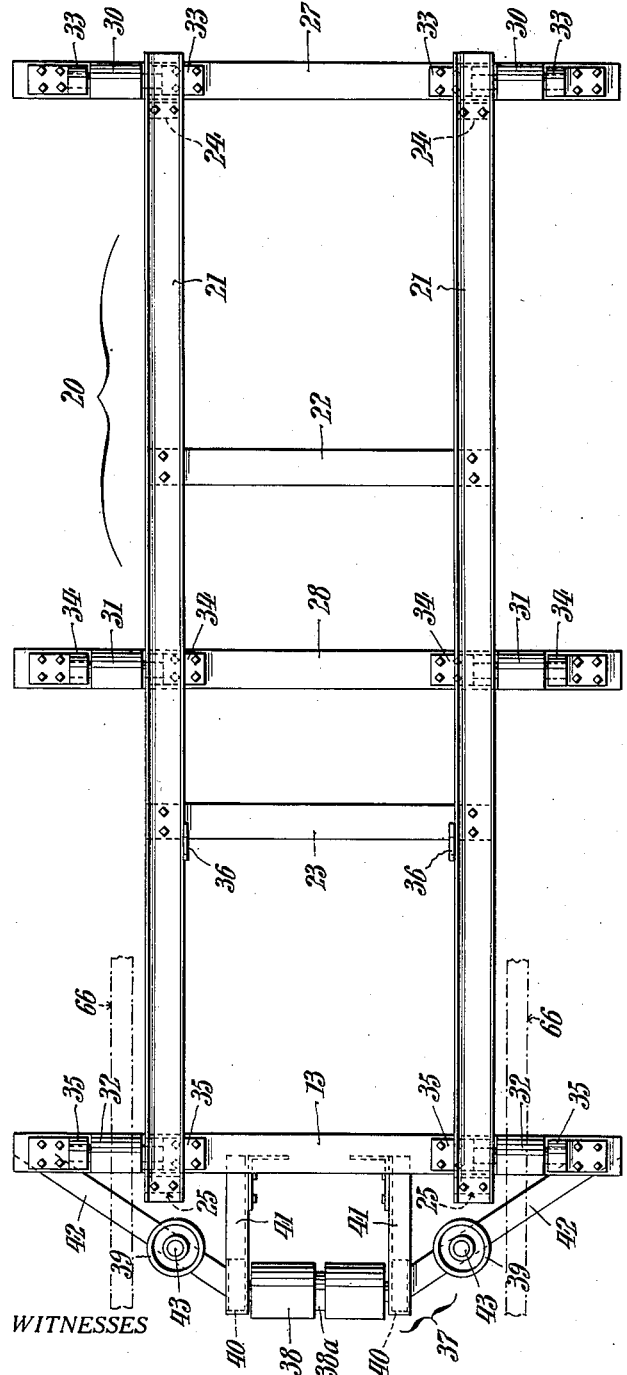
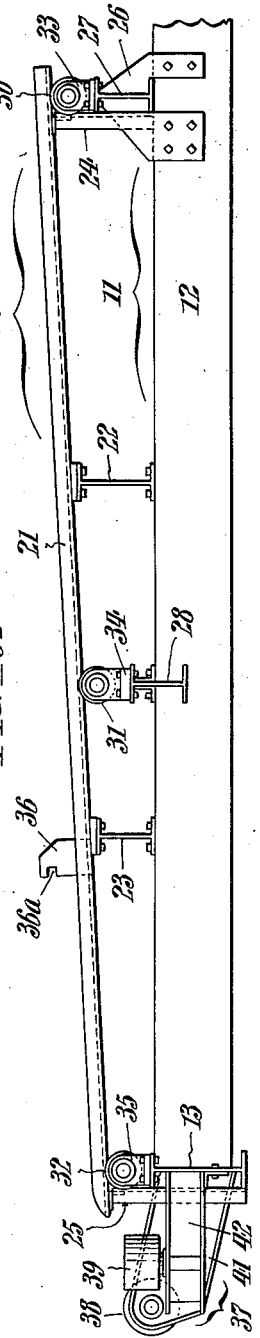
WITNESSES
A. J. Brittingham
Hubert Fuchs
INVENTOR:
Nemesio F. Alvare,
BY Paul & Paul
ATTORNEYS.

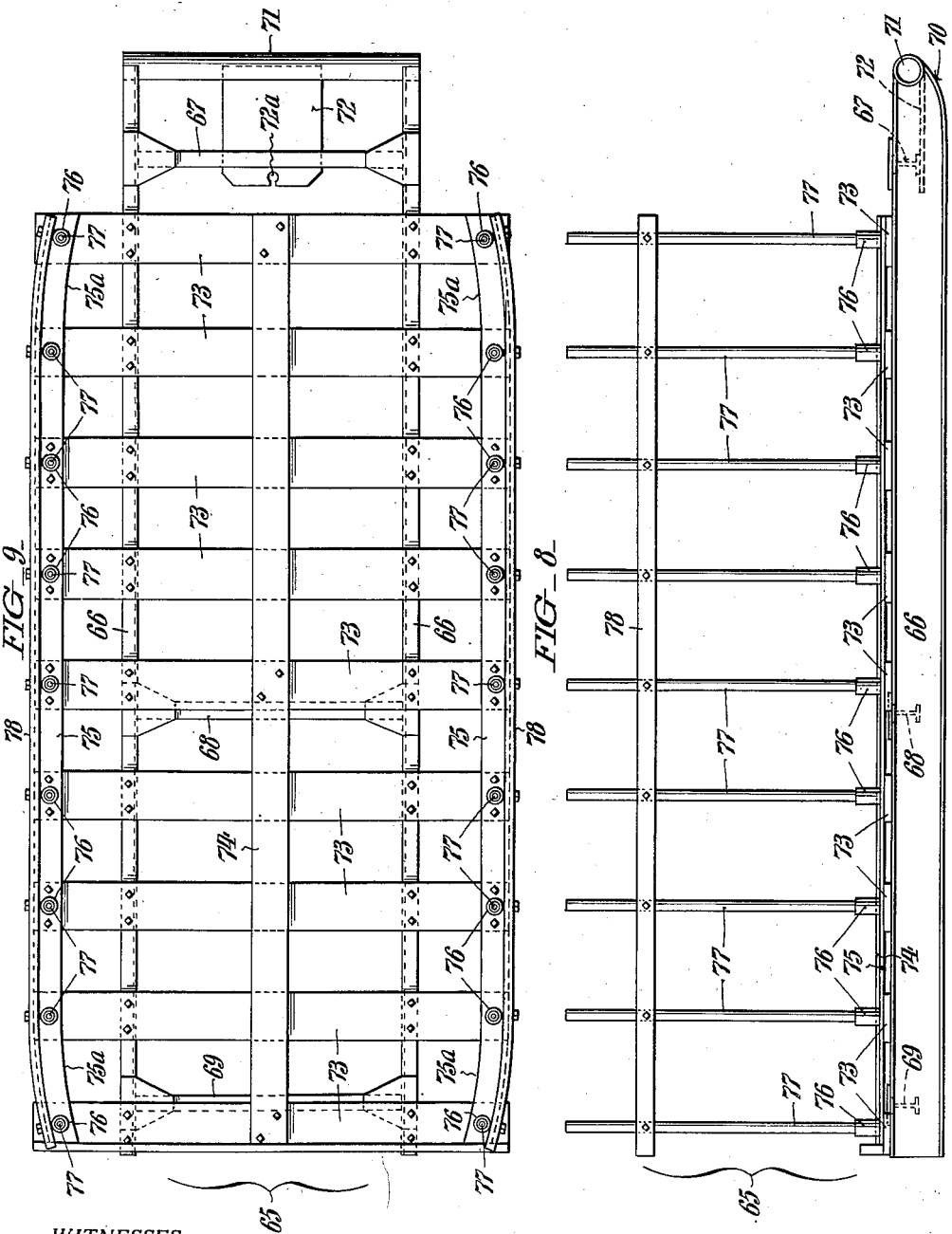

Patented May 23, 1950

2,508,740

UNITED STATES PATENT OFFICE 2,508,740

SELF-LOADING AND UNLOADING TRUCK

Nemesio F. Alvare, Overbrook, Pa.

Application May 19, 1948, Serial No. 28,016

5 Claims. (Cl. 214—85)

This invention relates to trucks. More specifically it has to do with trucks intended to be used in handling and transporting sugar cane or the like from the fields in which it is grown, to places of disposal such for example as railway freight stations, boat landings, processing plants or refiners, etc.

The chief aim of my invention is to provide a truck with facilities whereby products of the kind referred to can be handled and transported quickly and expeditiously at minimum expense from the standpoint of labor costs and without attendant injury to or loss of the product.

How the foregoing and other important objects and advantages are realized in practice, will appear from the following detailed description of the attached drawings, wherein Fig. 1 is a view, in side elevation, of a self-loading and unloading truck conveniently embodying my invention.

Figs. 2 and 3 are cross sectional views taken as respectively indicated by the angled arrows II—II and III—III in Fig. 1.

Fig. 4 is a fragmentary view partly in side elevation and partly in longitudinal section taken as indicated by the angled arrows IV—IV in Fig. 3.

Fig. 5 is a fragmentary detail view in elevation looking as indicated by the angled arrows V—V in Fig. 1.

Figs. 6 and 7 show the side elevation and top plan of a special or supplemental chassis frame structure constituting a part of my improved truck; and Figs. 8 and 9 are views likewise in side elevation and top plan of a skid also forming part of the truck.

With more detailed reference first more particularly to Figs. 1–3 of these illustrations, it will be observed that the truck has a conventional chassis frame 11 with the usual channel section side longitudinals or sills 12, a driver's cab and engine hood 14, a front axle 15 with steering wheels 16, and powered rear traction wheels 17. The truck 10 is moreover equipped at the front thereof forward of the engine hood with a winch 18 which, with suitable interposed gearing connections (not shown), is arranged to be driven by power from the truck motor.

Mounted upon its chassis frame 11 of the truck, rearward of the cab 14, a special supplemental frame structure which is separately shown in Figs. 6 and 7 and there comprehensively designated by the numeral 20. This supplemental frame structure comprises a pair of auxiliary channel section longitudinals 21 which are spaced to correspond with the chassis sills 12 and which are disposed at a slight rearward declination to the horizontal, being supported intermediate their ends by a pair of transverse I beams 22 and 23 which are bolted to said chassis sills. Adjacent their front ends, the auxiliary longitudinals 21 are supported from the chassis sills 12 by uprights 24 of structural steel, and adjacent their rear ends by similar uprights 25 which latter are secured to the rear transverse member 13 of the chassis frame. Lying crosswise of and secured to the chassis sills 12 adjacent the uprights 24 with the aid of gusset plates 26, is an I beam 27 whereof the opposite ends extend to equal distances beyond said sills as do also the opposite ends of the rear beam 13 of the chassis frame 12. Midway between the beams 13 and 27 is another transverse I beam 28 of corresponding length with its mid portion cut away as best seen in Fig. 2 to fit down over the chassis sills 12. Immediately outward of the auxiliary longitudinals 21 are aligned pairs of transverse axis rollers 30, 31 and 32 with their trunnions journaled in bearings 33, 34, and 35 fixedly supported on the outer end portions of the beams 27, 28 and 13 respectively. Secured to the inner flange faces of the longitudinals 21 in the region of the connecting cross beams 23 are upstanding lug projections 36 with notches 36a in their rear edges which serve in a capacity later on explained.

Rigidly secured to the rear end of the chassis frame 11 according to my invention, is a bracket 37 which is built up of structural steel. As shown, this bracket supports at a level below the tops of the auxiliary longitudinals 21 and beyond the rear ends of the latter, a central transverse axis roller 38 with a medial groove 38a, and a pair of symmetrically arranged laterally spaced vertical axis rollers 39. It is to be particularly noted that the centers of the rollers 39 are substantially in line with said auxiliary longitudinals and their peripheries substantially tangent to the planes of the outer sides of the longitudinals 21. The trunnions of the rollers 38 are journaled in bearings 40 at the ends of the channel section arms 41 extending outward from and rigidly secured to the crosswise beam 13 chassis frame 11 and braced by angular strut elements 42 of the bracket 37. The vertical axis rollers 39 on the other hand are freely rotatable about studs 43 upstanding from the struts 42.

Secured to the outer sides of the chassis frame sills 12 immediately behind the cab 14 are I section posts 45 which extend somewhat below said sills as shown in Figs. 1, 3 and 4. These posts 45 are braced by gusset plates 46 and connected top and bottom by built up cross members 47 and 48 of structural steel. Journalled in bearing lugs 49 upstanding from opposite ends of the cross member 47 is a transverse shaft 50 with hooks 51 secured thereto respectively adjacent the inner faces of said lugs, and with actuating handles 52 at its opposite ends. The purpose of this arrangement will also be later on explained. Freely rotative in bearings 55 centrally of the underside of the cross member 47 is a guide sheave 56 for a cable 57 which is adapted to be wound upon the winch 18 at the front end of the truck 10. A similar guide sheave 58 is rotatively supported somewhat to one side of the longitudinal center of the truck in bearings 59 affixed to the frontal face of the crosswise connecting member 48. As shown in Fig. 3, the axes of the sheaves 56 and 58 are inclined somewhat to the horizontal by reason of the laterally offset disposal of the latter relative to the former and to prevent skewing of the cable 57 as it passes between them. For the further guidance of the cable 57 I provided, beneath the front axial 15 of the truck 10, a flanged spool like roller 60, see Fig. 5, whereof the trunnions are journaled in a yoke 61 forming a part of a clamp 62 bolted to said axle.

In addition to the parts thus far described, my improved truck includes a skid which is comprehensively designated 65 and separately illustrated in Figs. 8 and 9. As shown skid 65 has a pair of parallel runners 66 of deep channel section steel arranged upright with their flanges extending outward and spaced by a somewhat greater distance than the longitudinal 21 of the special framing 20 as best seen in Fig. 2. The runners 66 of the skid are connected by suitably allocated transverse members 67, 68 and 69 in the form of I beams of which the depth (height) is substantially half that of the runners and so disposed vertically that they will not interfere with the progress of the skid when it is dragged over the ground during use of the apparatus. The front ends of the runners 66 are upwardly rounded as at 70 in Fig. 8 and connected by a tubular tie bar 71 which may be welded to said runners, and to which end the leading transverse member 67 is secured in a similar manner at the bottom, a plate 72 with a notch 72a in its rear edge for connection of the free end of the winch cable 57. Laid crosswise over the runners 66 from a point somewhat rearward of the leading cross member 67 and extending to equal distances beyond them are platform flooring planks 73 which may be of wood and secured by bolts as shown. Similarly secured to the planks 73 respectively at the center and at the ends are lengthwise strips 74 and 75 of metal, the latter having sockets 76 on the plank centers in which upright stakes 77 of tubular cross section are permanently anchored. It is to be particularly noted from Fig. 9 that the sill strips 75 are curved toward each other somewhat at the opposite ends as at 75a, and at the endmost stakes 77 inwardly offset relative to the others by corresponding distances. For greater stability, the stakes 77 are connected at an intermediate level by stringers 78.

Operation

In the use of the truck, the skid 65 is loaded in the field where the sugar cane is grown. The ripened cane is cut to suitable lengths and passed by the reaper to a helper positioned at the skid. As the helper receives the cane he forms it into piles such as shown at P in Fig. 1 over prelaid ropes or bands B. After each pile is completed, the ends of the corresponding rope or band B are brought over the top of the pile and tied together, the skid herein shown by way of illustration having a capacity for three bundles of cane so formed. After the skid is loaded in the manner explained, the truck 10 is backed into position relative thereto, whereupon the winch cable 57 which, as shown in Fig. 1 is confined to the center groove 38a in the horizontal axis roller 38 at the rear of the truck chassis 11, is connected to the front end of the skid by bringing it under the bar 71 and engaging it in the notch 72a of the plate 72. The knot or head enlargement indicated at 57a in Fig. 1 prevents the cable 57 from reeving through the notch of plate 72 when it is subsequently placed in tension as will be readily understood. The winch 18 is thereupon operated by power to wind in the cable 57 which latter is held to the longitudinal center of the truck between the roller 38 and the sheave 56, and which by reason of the length of the spool like roller 60 suspended from the front axle 15 of the drop is allowed to distribute itself properly on said winch. By the pull of the cable 57, the loaded skid is first dragged over the ground until it reaches approximately the position in which it is shown in broken lines in Fig. 1, whereupon it will be lifted at the front, and the curved ends 70 of the runners 66 brought over the first pair of side rollers 32 on the truck chassis, the cane bundles being restrained against shifting or falling out of the skid at this time by the constraining effect of the inwardly offset endmost stakes. As the winding of the cable 57 continues, the skid will be drawn onto the truck and when its center gravity passes beyond the rollers 32, it will drop from an angular position until its skids rest fully upon the remaining side rollers 31 and 30. Eventually the rod 71 at the front end of the skid, in under-travelling the beveled ends of the hooks 51 will automatically lift the latter which, upon passage of said rod will drop over it and so hold the skid against endwise shifting on the truck during subsequent transit. As the skid is pulled into place on the truck as just explained the lower flanges of the transverse I beam 68 of the skid will automatically engage within the notches 36a of the lugs 36 on the longitudinals 21 of the special framing 20 and so operate thereafter to hold the skid down upon the truck chassis. Moreover as the skid is drawn upon the truck it will be centered automatically by coaction of the vertical axis rollers 39 at the rear end of the truck chassis 12 with the inner faces of the skid runners 66 which latter are partly shown in dot and dash lines in Fig. 7. When in place on the truck, the skid will be prevented from shifting laterally during transit through interception of the runners 66 by the longitudinals 21 of the special frame 20 in a manner readily understood in Fig. 2. At the place of delivery, which may be the freight receiving platform of a railway or a boat landing, the bundles are withdrawn upwardly out of the skid without removal of the latter from the truck, by attaching the hook of a lifting crane to the ropes by which the cane stalks are bound into said bundles. After being unloaded, the truck is returned to the cane field and upon its arrival there, the shaft 50 is turned by means of one of its handles 52 to lift the hooks 51 out of engagement with front bar 71 of the skid. The winch 18 is thereupon reverse operated to control the skid as it rolls rearward by gravity from off the truck and finally rests upon the ground.

In practice two skids are preferably provided for use with the truck. This is of advantage in that one skid can be loaded while the other is in transit, thereby making possible the continued employment of the truck and avoiding loss of valuable time on the part of the truck driver.

Having thus described my invention, I claim:

1. A self-loading and unloading truck having a chassis frame with parallel longitudinals, crosswise aligned pairs of transverse axis rollers extending outwardly from the chassis longitudinals respectively with their tops below the top plane of said longitudinals; a skid having parallel runners spaced for support on said rollers; a cable releasably connectable to the front end of the skid; a winch on the truck for winding the cable to draw the skid into the truck; and a pair of vertical axis rollers at the rear end of the truck below the tops of the chassis longitudinals with their outer sides substantially tangent to the outer sides of said longitudinals, adapted to be engaged by the insides of the skid runners to center the skid as it is drawn onto the truck by the cable.

2. A self-loading and unloading truck having a chassis frame with parallel longitudinals; crosswise aligned pairs of transverse axis rollers extending laterally in opposite directions from the chassis longitudinals with their tops below the top plane of said longitudinals; a skid with parallel runners spaced for support upon said rollers, platform flooring overlaid upon and secured to the runners, and transverse beams connecting the runners at intervals below the flooring; and lug projections with notches in their rear edges extending upward from the chassis longitudinals to engage one of the transverse beams of the skid to hold the latter against rising after it is drawn to final position on the truck.

3. A self-loading and unloading truck having a chassis frame with parallel longitudinals; crosswise aligned pairs of transverse axis rollers extending laterally in opposite directions from the chassis longitudinals with their tops below the plane of said longitudinals; a skid with parallel runners spaced for support upon said rollers, and having platform flooring overlaid upon them, said runners extending forwardly beyond the flooring and being there connected by a crosswise tie bar; and pivoted hooks on the truck adapted to swing downward to engage behind the tie bar of the skid as the latter is drawn into final position on the truck and to thereafter hold the skid against displacement on the chassis frame.

4. A self-loading and unloading truck having a chassis frame, an engine hood and driver's cab at the forward end of the chassis, powered rear wheels, and a front axle with steering wheels; a winch at the front end of the truck beyond the engine hood; a skid adapted to be drawn onto the truck by a cable wound on the winch; a circumferentially grooved horizontal axis roller at the rear end of the truck over which the cable is passed for connection to the front of the skid; and a system of guide sheaves for directing the cable downward from the winch under the front axle and beneath the cab to a point immediately to the back of the latter, and finally longitudinally of the truck chassis to the grooved roller at the rear of the truck.

5. A self-loading and unloading truck for sugar cane or the like, having a chassis frame with parallel longitudinals, and crosswise aligned pairs of transverse axis rollers extending laterally in opposite directions from the chassis longitudinals with their tops below the top plane of said longitudinals; a winding winch on the truck for a draw cable; and a skid having parallel runners spaced for support upon said rollers, flooring on the runners, and a row of stakes upstanding from the runners at each side with the innermost stakes set inward somewhat beyond the others so as to prevent bound bundles of the cane arranged lengthwise of the skid from sliding out of the ends of the skid as it is drawn onto the truck by the cable.

NEMESIO F. ALVARE.

REFERENCES CITED

The following references are of record in the file of this patent:

UNITED STATES PATENTS

| Number | Name | Date |
|---|---|---|
| 1,250,505 | Reasoner | Dec. 18, 1917 |
| 1,870,573 | Kuchar | Aug. 9, 1932 |
| 1,885,399 | Wren | Nov. 1, 1932 |
| 2,188,374 | Sanchez | Jan. 30, 1940 |

FOREIGN PATENTS

| Number | Country | Date |
|---|---|---|
| 160,437 | Great Britain | Nov. 18, 1921 |